March 7, 1939.     D. J. BERGMAN     2,149,831
HEATING OF FLUIDS
Original Filed Jan. 5, 1935
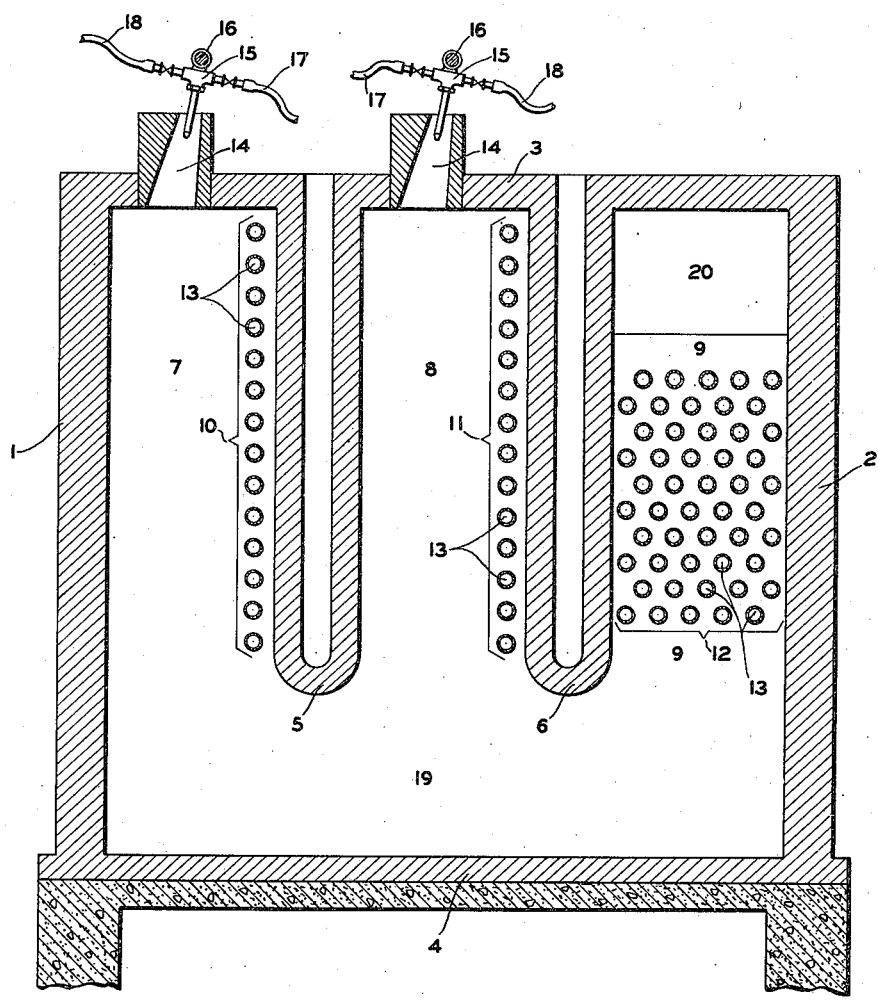
INVENTOR
DONALD J. BERGMAN
BY *Lee J. Gary*
ATTORNEY Patented Mar. 7, 1939

2,149,831

UNITED STATES PATENT OFFICE 2,149,831

HEATING OF FLUIDS

Donald J. Bergman, Chicago, Ill., assignor to Universal Oil Products Company, Chicago, Ill., a corporation of Delaware Application January 5, 1935, Serial No. 467
Renewed September 17, 1938

6 Claims. (Cl. 122—356)

This invention particulary refers to an improved form of furnace for the heating of fluids, which, although applicable to the heating of liquids, vapors and gases generally, is particularly adapted to the heating of hydrocarbon oils to the high temperatures required for their pyrolytic conversion.

In oil distilling and cracking processes it is desirable to obtain high average rates of heating through improvements in the uniformity of the heat applied to the fluid conduit. It is also particularly advantageous to control the rates of heating about different portions of the fluid conduit through which the oil undergoing conversion is passed in order to regulate the type of heating curve obtained to suit the requirements of the particular type of oil undergoing treatment so as to obtain a maximum yield of the desired products of uniformly good quality.

The apparatus of the present invention not only permits the use of high average rates of heating in that portion of the heating coil or fluid conduit wherein high rates of heat input are desirable but also provides for varying the heating conditions about different portions of the fluid conduit so as to independently control the rates of heating at various stages during the heat treatment.

The apparatus of the present invention is also adaptable to the treatment of two or more streams of different fluids each under independently controlled heating conditions or, when desired, two or more streams of the same fluid may each be subjected simultaneously to substantially the same heating conditions.

In order to conserve fuel by reducing the flue gas temperatures provision is made in the furnace of the present invention for commingling the relatively hot combustion gases from the zones employing relatively high rates of heating and passing the commingled combustion gases over another portion of the fluid conduit wherein lower rates of heating are desirable or at least wherein relatively high rates of heating are not essential to the successful operation of the process.

In one specific embodiment, the apparatus of the present invention comprises a furnace having side walls, end walls, a roof and a floor, partitions separating the interior of the furnace into a plurality of separate combustion and heating zones and a separate fluid heating zone, a vertically disposed bank of tubes located adjacent one wall of each combustion and heating zone disposed to receive heat on one side by direct radiation from the materials undergoing combustion and the hot refractory opposite wall of the combustion and heating zone and on the opposite side by reflected radiation from the adjacent wall, means for supplying combustible fuel in independently controlled amounts to each combustion and heating zone and directing the flames resulting from combustion of the fuel in each combustion and heating zone against the wall of said zone opposite that adjacent the bank of tubes therein, whereby to heat the wall to a highly radiant condition and whereby to prevent the impingement of flames against the tubes of the fluid conduits, a separate bank of tubes located within the fluid heating zone of the furnace and means for passing commingled combustion gases from each of said separate combustion and heating zones over the tubes of the fluid conduit within said fluid heating zone whereby to impart heat thereto primarily by convection.

As a special feature of the present invention, means are provided for adjusting the angular position of the burners which supply fuel to each of the combustion and heating zones whereby the point of impingement of the flames against the highly heated radiating wall of each combustion and heating zone may be varied to suit requirements, thereby exerting a considerable degree of independent control over the heating conditions and rates of heating in the upper and lower portions of the tube bank in each combustion and heating zone.

The accompanying diagrammatic drawing illustrates one specific form of furnace structure embodying the features of the present invention although it will be understood that the invention is not limited to the specific form of furnace illustrated since many modifications are possible within the scope of the invention.

Referring to the drawing, the main furnace structure comprises side walls 1 and 2, a roof 3, a floor 4, end walls which are not indicated in the particular view of the furnace here illustrated and suspended walls or partitions 5 and 6 of any suitable form which divide the interior of the furnace into two separate combustion and heating zones 7 and 8 and a fluid heating zone 9.

A fluid conduit 10 comprising, in the case here illustrated, a single vertical row of horizontally disposed tubes 13 is located adjacent the surface of wall 5 within combustion and heating zone 7 and a similar fluid conduit 11 is located adjacent the surface of wall 6 within combustion and heating zone 8. Another fluid conduit 12 comprising, in the case here ilustrated, a plurality of superimposed horizontal rows of horizontally disposed tubes 13 is located within fluid heating zone 9 of the furnace.

In the particular form of furnace here illustrated firing ports 14 are provided in the roof of the furnace above each of the combustion and heating zones. The burner ports are preferably in the form of a continuous slot extending substanially the entire width of the furnace or a plurality of individual ports may be provided along the width of the furnace so that a substantially continuous sheet of flame results extending across the entire width of each combustion and heating zone.

Burners 15, of any suitable form, supply combustible fuel and air to each of the combustion and heating zones and preferably the burners are slightly tilted, as indicated in the drawing, so that the flames resulting from the combustion of the fuel in combustion and heating zones 7 and 8 impinge against the surface of walls 1 and 5 in the respective zones, heating the same to a highly radiant condition. The angular position of the burners also assists in preventing impingement of the flames against the tubes of banks 10 and 11. Preferably the angular position of the burners serving each of the combustion and heating zones is adjustable so as to control the point of impingement of the flames against the radiating walls of each combustion zone. This may be accomplished, for example, as indicated in the drawing, by mounting the burners on shafts 16, which may be rotated through the arc of a circle by any suitable means, not illustrated, and flexible conduits 17 and 18 may be provided connecting each of the burners with the fuel and air supply lines.

The tubes of fluid conduits 10 and 11 receive heat by direct radiation from the materials undergoing combustion in the respective combustion zones 7 and 8 and from the hot refractory walls 1 and 5 in the respective zones and the opposite sides of the tubes are heated by reflected radiation from the adjacent surfaces of walls 5 and 6 in the respective combustion and heating zones 7 and 8. A passageway 19 is provided within the main furnace structure beneath the suspended walls or partitions 5 and 6 and the hot combustion gases from each of the combustion and heating zones 7 and 8 commingle therein and are thence directed through fluid heating zone 9 in contact with the tubes of bank 12 to which they impart heat primarily by convection. The combustion gases having passed over the tubes of bank 12 may be directed through flue 20 to a suitable stack, not shown.

Preferably adjacent tubes in each of the vertical rows 10 and 11 are connected at their ends in series by means of suitable return bends, not illustrated, which are preferably located outside the heating zone, although it is entirely within the scope of the present invention to manifold a portion or all of the tubes in each bank. Suitable headers or return bends, not illustrated, are also provided for connecting the tubes of bank 12 either in parallel or in series or partially in both manners. The various tube banks may be connected in any desired sequence or parallel flow may be employed in banks 10 and 11 and/or in different portions of bank 12.

As previously mentioned, the furnace structure of the present invention may vary considerably from the specific form illustrated without departing from the scope of the invention. For example, any desired number of separate combustion and heating zones such as 7 and 8 may be employed and the combustion gases from the various combustion and heating zones may, when desired, be distributed to suit requirements between any desired number of a plurality of fluid heating zones such as zone 9. It is also within the scope of the present invention to employ more than a single vertical row of tubes adjacent one wall of any or all of the separate combustion and heating zones although when more than a single row is employed the tubes in the various rows are preferably spaced so that each tube receives heat on one side by direct radiation from the materials undergoing combustion and the hot refractory wall against which the flames are allowed to impinge and on the opposite side by reflected radiation from the wall of the furnace adjacent the tube bank. The invention also contemplates locating the fluid heating zone beneath instead of at the side of the combustion and heating zones or the fluid heating zone may be located between two combustion and heating zones.

The invention further contemplates the use of up-firing instead of down-firing with burners located adjacent the floor instead of adjacent the roof of the furnace in which case either up-draft or down-draft may be employed through the fluid heating zone. With up-firing in a furnace otherwise similar to that illustrated in the accompanying drawing the flames will be directed in a general upward direction against walls 1 and 5 in combustion and heating zones 7 and 8 respectively and the combustion gases, in returning to passageway 19 will wash the tubes of banks 10 and 11 thereby imparting a considerable amount of heat to the tube by convection. When two or more combustion and heating zones are employed up-firing may be employed in one or more of said zones and down-firing in the other, when desired.

I claim as my invention:

1. A furnace for the heating of fluids which comprises, in combination, side walls, end walls, a roof and a floor, partition walls within the furnace extending between the side walls and from the roof to a point above the floor dividing the interior of the furnace into a plurality of separate combustion and heating zones and a separate fluid heating zone, a fluid conduit comprising a vertical bank of horizontally disposed tubular elements located adjacent one wall of each combustion and heating zone, another fluid conduit comprising a plurality of rows of horizontally disposed tubular elements located within said fluid heating zone, burner ports extending through the roof of each combustion and heating zone, means for supplying fuel and air through said burner ports to each combustion and heating zone whereby to form a substantially continuous sheet of flame extending between the side walls of the furnace in each combustion and heating zone, means for directing the flame at an angle against the wall opposite that adjacent the fluid conduit in each combustion and heating zone, and means for passing hot combustion gases from the combustion and heating zones over the fluid conduit in said fluid heating zone.

2. A furnace for the heating of fluids which comprises, in combination, side walls, end walls, a roof and a floor, partition walls within the furnace extending between the side walls and from the roof to a point above the floor dividing the interior of the furnace into a plurality of separate combustion and heating zones and a separate fluid heating zone, a fluid conduit comprising a vertical bank of horizontally disposed tubular elements located adjacent one wall of each combustion and heating zone, another fluid conduit comprising a plurality of rows of horizontally disposed tubular elements located within said fluid heating zone, burner ports extending through the roof of each combustion and heating zone, means for supplying fuel and air through said burner ports to each combustion and heating zone whereby to form a substantially continuous sheet of flame extending between the side walls of the furnace in each combustion and heating zone, means for directing the flame at an angle against the wall opposite that adjacent the fluid conduit in each combustion and heating zone, means for varying the point of impingement of the flame against said wall in each combustion and heating zone, and means for passing hot combustion gases from the combustion and heating zones over the fluid conduit in said fluid heating zone.

3. A heater for fluids comprising, in combination, separate combustion zones each having a substantially vertical fired wall and an unfired wall substantially parallel to and spaced from the fired wall to form the combustion zone therebetween, means comprising a plurality of burners for projecting flames and hot combustion gases in a substantially continuous sheet and in a substantially vertical direction over and in intimate contact with the surface of the fired wall in each combustion zone, whereby to heat said surface to a highly radiant condition, a substantially vertical bank of horizontally disposed tubular elements located in each combustion zone out of the direct path of travel of said flames and hot combustion gases and in close proximity to said unfired wall, the spacing between said fired and unfired walls and the arrangement of said tubular elements being such that the tubes in each combustion zone are each subjected to high rates of heat on one side, by direct radiation from the flames, hot combustion gases and fired wall in the same combustion zone, and subjected on the opposite side to less intense heating by reflected radiation from the adjacent unfired wall.

4. A heater such as defined in claim 3 having a separate heating zone communicating with said combustion zones for the passage therethrough of partially cooled combustion gases which have passed over said fired walls, and fluid conduits disposed in said separate heating zone in the direct path of travel of said partially cooled combustion gases.

5. A heater for fluids comprising, in combination, an elongated combustion zone having a substantially vertical fired wall and an opposite unfired wall substantially parallel to the fired wall and spaced therefrom to form the combustion zone, means comprising a plurality of burners for projecting flames and hot combustion gases, in a substantially continuous sheet and in a substantially vertical direction, over and in intimate contact with the surface of said fired wall in the combustion zone, whereby to heat said surface to a highly radiant condition, a substantially vertical bank of horizontally disposed fluid conduits located in the combustion zone out of the direct path of travel of said flames and hot combustion gases and in close proximity to said unfired wall, the walls of the combustion zone being otherwise substantially devoid of fluid conduits and the arrangement of said fluid conduits being such that each is heated, on one side, by direct radiation from the flames, hot combustion gases and fired wall and, on the opposite side by reflected radiation from the unfired wall.

6. A heater such as defined in claim 5 having a separate heating zone communicating with said combustion zone for the passage therethrough of partially cooled combustion gases which have passed over said fired wall, and fluid conduits disposed in said separate heating zone in the direct path of travel of said partially cooled combustion gases.

DONALD J. BERGMAN.